(12) United States Patent
Wen et al.

(10) Patent No.: US 7,760,390 B2
(45) Date of Patent: Jul. 20, 2010

(54) BINARY RESOLUTION CONVERSION APARATUS AND METHOD

(75) Inventors: Zhenhuan Wen, Rochester, NY (US); Francis Kapo Tse, Rochester, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1203 days.

(21) Appl. No.: 11/300,835

(22) Filed: Dec. 15, 2005

(65) Prior Publication Data

US 2007/0139668 A1 Jun. 21, 2007

(51) Int. Cl.
*G06K 15/02* (2006.01)
*G06K 9/32* (2006.01)

(52) U.S. Cl. .......................... 358/1.2; 358/1.13; 358/2.1; 358/1.18; 358/462; 358/3.27; 382/298; 382/269; 382/266; 382/202; 382/199

(58) Field of Classification Search ......... 358/1.1–1.15, 358/451–464, 2.1, 1.18, 538, 179, 3.03, 3.27, 358/447, 505; 382/199, 202, 232, 266, 267, 382/268, 298–301; 345/671–699
See application file for complete search history.

(56) References Cited

U.S. PATENT DOCUMENTS

| | | | |
|---|---|---|---|
| 5,045,952 A | 9/1991 | Eschbach | |
| 5,226,094 A | 7/1993 | Eschbach | |
| 5,276,525 A * | 1/1994 | Gharavi | 382/245 |
| 5,696,601 A | 12/1997 | Metcalfe et al. | |
| 5,742,703 A * | 4/1998 | Lin et al. | 382/176 |
| 5,805,304 A * | 9/1998 | Sekine | 358/1.2 |
| 6,563,963 B1 * | 5/2003 | Nacman et al. | 382/298 |
| 6,751,358 B1 | 6/2004 | Mantell et al. | |
| 6,754,401 B2 | 6/2004 | Nacman et al. | |
| 6,834,124 B1 * | 12/2004 | Lin et al. | 382/261 |
| 7,151,863 B1 * | 12/2006 | Bradley et al. | 382/299 |
| 7,352,490 B1 * | 4/2008 | Tse et al. | 358/1.9 |
| 2001/0021035 A1 * | 9/2001 | Takashimizu | 358/1.9 |
| 2002/0097416 A1 * | 7/2002 | Chang et al. | 358/1.13 |

\* cited by examiner

*Primary Examiner*—Twyler L Haskins
*Assistant Examiner*—Dennis Dicker
(74) *Attorney, Agent, or Firm*—Fay Sharpe LLP

(57) ABSTRACT

A binary resolution conversion apparatus and method is provided. According to one exemplary embodiment, a binary resolution conversion method includes an image processing method comprising a data processing process comprising a first video data input process receiving a first video data group associated with one or more horizontal and vertical edges of an image, and one or more horizontal and vertical thin lines of the image; a second video data input process receiving a second video data group associated with one or more slanted edges and one or more slanted lines of the image, and one or more objects of the image; a tag data input process receiving tag data associated with image edge and image thin line detection data; and a first video data input providing the video data output to a first video data output if the tag data input indicates an image edge or image thin line, otherwise a second video data input providing the video data output.

16 Claims, 5 Drawing Sheets

BINARY RESOLUTION CONVERSION APARATUS AND METHOD

BACKGROUND

Binary resolution conversion involves the conversion of a binary file at one resolution to a binary file at a second resolution. Conventional applications of a binary resolution conversion process include file size reduction for reducing file storage requirements, converting a higher resolution binary file to a lower resolution binary file for display on a monitor which requires the lower resolution file, increasing the data transmission speed associated with a data file, and converting a higher resolution image file to a lower resolution image file for printing with a device with a limited resolution capability.

The applications of a binary resolution conversion apparatus and method are not limited to the applications listed above. All data transfers, whether internal or external to a digital data device, may incorporate a binary data conversion algorithm to increase efficiency and/or conform to the resolution requirements of an internal/external data handling device.

To describe one example, Native PCL (Printer Control Language) printing resolution is 600×600 dpi. However, the default print resolution of solid inkjet printing products is always less than 600×600 dpi to maintain acceptable performance and ink coverage. For example, an inkjet printer with a default printer resolution of 450×500 dpi. Native PCL printing at 600×600 dpi is slow and can't meet the product specified PPM (Page Per Minute) requirement of inkjet printers. However, PCL printing provides acceptable performance for other faster printing platforms.

One solution for solid inkjet products using Native PCL is the incorporation of a Fast PCL printing mode in which the original 600×600 dpi×1-bit PCL rendered data is converted to 600×300 dpi×1-bit. This conversion is accomplished by an OR operation along the Y direction in software post processing. The image is then printed at 600×300 dpi to satisfy the product specified PPM requirement. This produces a printed image which includes jaggedness along slanted edges degrading text quality, unsaturated color solid fill areas due to the low-resolution, and disappearance of white thin lines along the x direction of the original PCL image in high density areas.

As described above, a better way of converting the resolution of a binary data file is needed.

INCORPORATION BY REFERENCE

U.S. Pat. No. 5,226,094, issued to Eschbach, the entire disclosure of which is incorporated by reference, provides a method for making image conversions with error diffusion.

U.S. Pat. No. 6,754,401, issued to Nacman et al., the entire disclosure of which is incorporated by reference, provides a high quality system and method of digital scaling using image tags.

U.S. Pat. No. 6,751,358, issued to Mantell et al., the entire disclosure of which is incorporated by reference, provides an error diffusion system for digital printing.

U.S. Pat. No. 5,696,601, issued to Metcalfe et al., the entire disclosure of which is incorporated by reference, provides a system and method for redistributing error values from an error diffusion process.

U.S. Pat. No. 5,045,952, issued to Eschbach, the entire disclosure of which is incorporated by reference, provides a method for edge enhanced error diffusion.

BRIEF DESCRIPTION

An apparatus comprising a data processing module comprising a first data input configured to receive a first data group associated with the horizontal and vertical edges of an image, and the horizontal and vertical thin lines of the image; a second data input configured to receive a second data group associated with the slanted edges and slanted lines of the image, and the object of the image; a tag data input configured to receive tag data associated with the image edge and image thin line detection data; and a data output, wherein the first data input provides the data output if the tag data input indicates an image edge or image thin line, otherwise the second data input provides the data output.

A method of processing data, the method comprising generating a first data group associated with the horizontal and vertical edges of an image, and the horizontal and vertical thin lines of the image; generating a second data group associated with the slanted edges and slanted lines of the image, and the object of the image; generating tag data associated with the edge and image line detection data; and generating a data output, wherein the first data group provides the data output if the tag data indicates an image edge or image thin line, otherwise the second data group provides the data output.

DETAILED DESCRIPTION

As discussed in the background section of this disclosure, this disclosure is related to an apparatus and method of converting the resolution of a binary data file. The disclosed apparatus and method is not limited to the embodiments described and provides a binary resolution conversion solution for any binary data file requiring conversion to the second resolution. Examples include, but are not limited to, binary resolution conversion to increase internal/external data transmission, binary resolution conversion to enable compatibility between digital data devices requiring multiple resolutions based on an original higher resolution data file, and binary resolution conversion of an image file to the second resolution image file for printing on a device with limited resolution capabilities.

Figure 1:
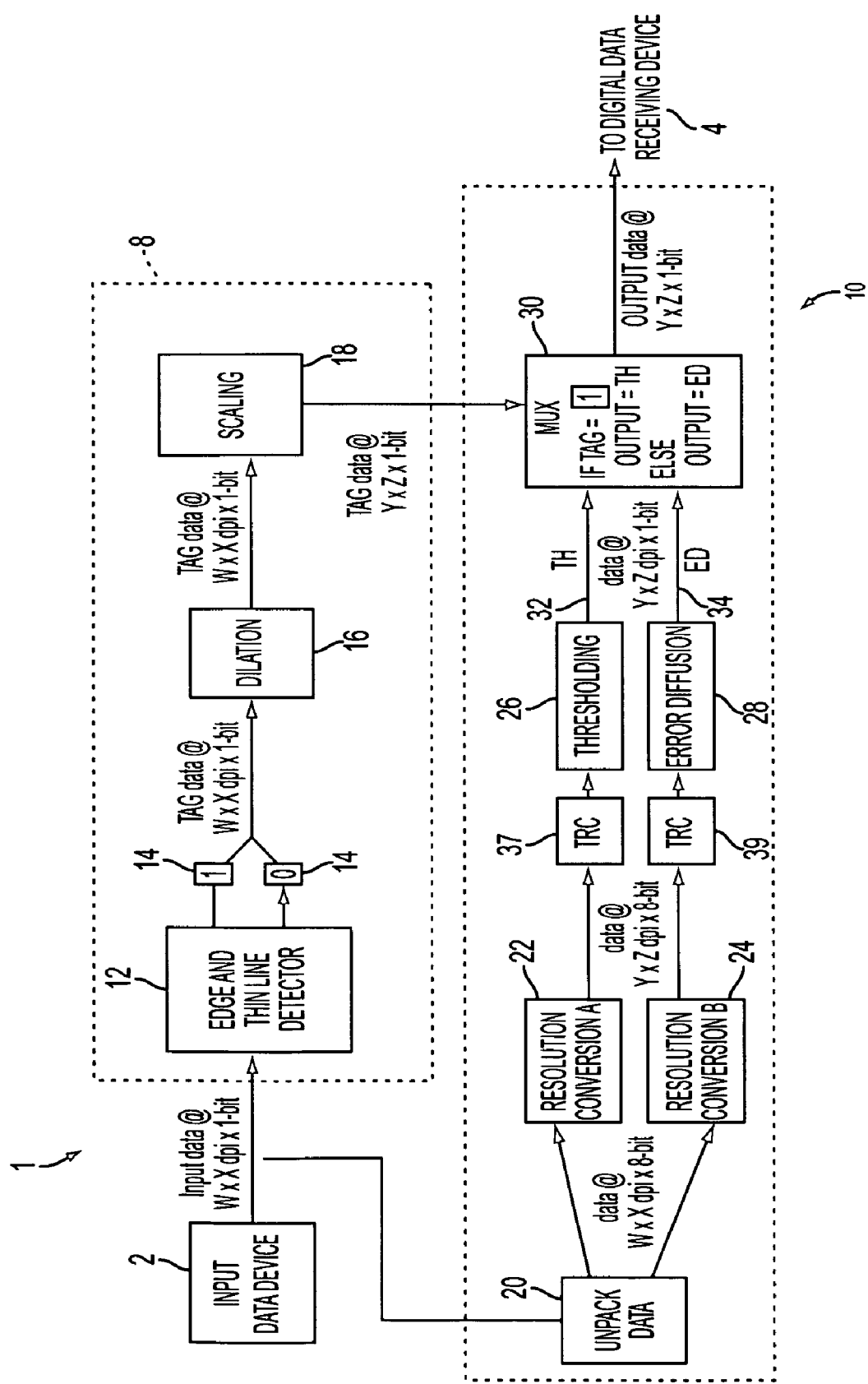
FIG. 1 is a flow chart according to one exemplary embodiment.

With reference to FIG. 1, illustrated is a block diagram flow chart 1 of a binary resolution conversion apparatus and method according to one embodiment of this disclosure. In general, an Input Data Device 2 provides input data @W×X dpi×1-bit which represents data to be converted from resolution W×X dpi to resolution Y×Z dpi. The input data can be from any digital data source which provides data at a predetermined resolution in 1-bit format. Alternatively, a Printer PDL (Page Description Language) interpreter (not shown) could be added to the system to condition the data to a 1-bit format at the predetermined resolution of W×X for subsequent resolution conversion to Y×Z dpi×1-bit.

Subsequent to the binary resolution conversion apparatus receiving input data @W×X dpi×1-bit, the W×X dpi×1-bit data is processed along two independent paths 8 and 10 to produce digital data @Y×Z dpi×1-bit. One processing path includes a Tag Generation Module 8 and the other processing path includes a Data Processing Module 10.

The Tag Generation Module 8 provides an edge and/or thin line detection operation 12 on each pixel of the input data using a detection mask. For example, if a pixel is determined to be located on a horizontal/vertical edge and/or line, a tag bit value associated with the pixel is set to 1, otherwise this bit is set to 0. This tag data associated with each pixel provides the basis for the Data Processing Module 10 to select a source of data which was converted to the second resolution based on specific attributes of the pixel, i.e. whether the pixel is located on an edge and/or thin line, etc. As will be explained in further detail below, the ability of the Data Processing Module 10 to select specific data at the second resolution of Y×Z dpi depending on the pixel location, enables the binary resolution conversion apparatus and method 1 illustrated in FIG. 1 to provide the second resolution binary data to a Digital Data Receiving Device 4 while providing better control of the output data relative to reproducing the input data.

A more detailed description of the binary resolution conversion apparatus and method 1 is now provided.

The binary resolution conversion apparatus and method illustrated in FIG. 1 is a tag-based binary resolution conversion system and algorithm which converts original W×X dpi× 1-bit data to Y×Z dpi×1-bit data. For example, W×X dpi could represent 650×650 dpi and Y×Z could represent 300×300 dpi. Other resolution conversion parameters are within the scope of this disclosure and include all resolution conversion possibilities. The tag-based binary resolution conversion system and algorithm includes post-processing between an Input Data Device 2 and a Digital Data Receiving Device 4.

As previously discussed, the binary resolution conversion system includes a Tag Generation Module 8 and a Data Processing Module 10. The Tag Generation Module 8 includes an Edge and Thin Line Detector 12 which detects and assigns a one-bit classification tag 14 to each pixel of the data at W×X dpi×1-bit using a predefined detection mask with a N×M size. In one exemplary embodiment of this disclosure N×M represents a 3×3 mask.

The classification tags 14 are subsequently processed through a dilation operation 16 before being scaled down 18 to Y×Z dpi. The dilation size is P×Q which is dependent on the ratio of first resolution to second resolution. In one exemplary embodiment of this disclosure, P×Q is 3×3 for 600×600 dpi as a first resolution and 450×500 as a second resolution. Also in one exemplary embodiment of this disclosure, a nearest neighbor scaling algorithm is utilized for the scaling operation. However, other scaling algorithms are known to those of ordinary skill in the art which can achieve satisfactory results.

A 1-bit tag 14, which can be programmed or hardware implemented to represent either an edge and thin line, or alternatively represent an edge or thin line, allows optimal processing and rendering of each pixel based on its type. The output of the Tag Generation Module 8 includes tag data at Y×Z dpi×1-bit.

With regard to the Data Processing Module 10, the input data of W×X dpi×1-bit is unpacked 20 to 8-bit data for purposes of this description. However, other embodiments include unpacking data to 16-bit, 32-bit, 64-bit, 128-bit, 256-bit, etc. The 8-bit data is subsequently parallel processed to produce two sets of 1-bit data at the Y×Z dpi resolution by two independent Resolution Conversion Modules 22 and 24. The two sets of resolution converted data are subsequently processed using a Thresholding technique 26 for one path and an Error Diffusion technique 28 for the other path. The Thresholding Module 26 and Error Diffusion Module 28 are generally referred to as Rendering Modules.

Finally, the two sets of 1-bit data are MUXed 30 based on the tag data generated by the Tag Generation Module 8 for each pixel. Specifically, the MUX 30 selects data at Y×Z dpi resolution from the thresholding processing path if the corresponding pixel tag data is set to a logical 1, indicating the pixel is located on an edge and/or thin line. The thresholding processed data 32 is selected in this case because thresholding provides a relatively better quality representation of the edge and/or thin line pixels, as compared to error diffusion.

Alternatively, if the corresponding pixel tag data is set to a logical 0, indicating the pixel is not located on an edge and/or thin line, the MUX 30 selects the data processed through the error diffusion path. The error diffusion processed data 34 providing a relatively better quality representation of object and slanted edge/lines.

The output of the MUX 30 and Data Processing Module 10 is delivered to a Data Receiving Device 4 at Y×Z dpi×1-bit.

As a further refinement of the system and method described heretofore, TRC (Tone Reproduction Curve) submodule/algorithm 37 and/or 39 are provided to further adjust the density of data at specific pixel locations independently.

Discussed heretofore is a substantial description of a binary resolution conversion apparatus and method as disclosed. To further illustrate and describe the operation of a binary resolution conversion system including the apparatus and method of one exemplary embodiment is provided.

Figure 2:
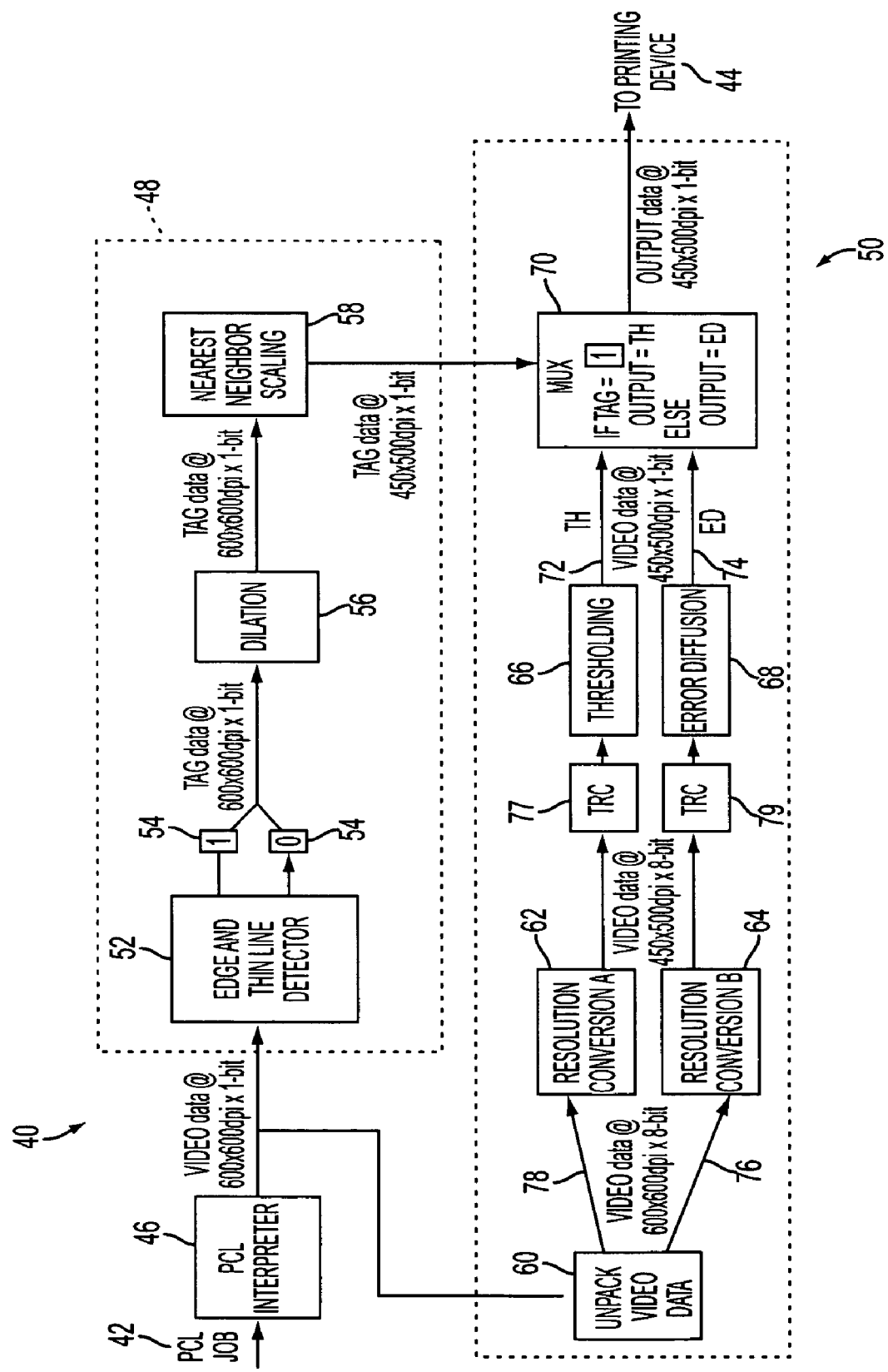
FIG. 2 is a flow chart according to another exemplary embodiment.

With reference to FIG. 2, illustrated is a flow chart of a Fast PCL printing system 40 according to one embodiment of this disclosure. As illustrated in FIG. 2, this embodiment includes the case of a 600×600 dpi black/white PCL job being processed to produce a black/white 450×500 dpi output. The black/white 450×500 dpi output is transmitted to a Printing Device 44 (not shown).

To process a color PCL job, each separation color of C (Cyan), M (Magenta), Y (Yellow) and K (Black) is treated independently according to the Fast PCL printing system represented by the flow chart of FIG. 2. This may include multiple embodiments of the FIG. 2 flow chart, each embodiment dedicated to a single color or color range. Another possible variation includes the use of a single embodiment of the FIG. 2 flow chart, each color being independently and sequentially processed. It will be appreciated by those of ordinary skill in the art that parallel processing of multiple colors will minimize processing time and contribute to a higher marking throughput.

The detailed description of FIG. 2 which follows, describes a FAST PCL printing system according to one embodiment of this disclosure which includes the conversion of a PCL job from 600×600 dpi to 450×500 dpi, however, this disclosure is not limited to these resolutions. This disclosure describes a Fast PCL printing system which can convert from one resolution to a second resolution, without restriction to specific resolutions.

The exemplary embodiment of this disclosure, as illustrated in FIG. 2, is representative of a printing system required to reduce the resolution of a Native PCL job at 600×600 dpi to a default resolution better suited for printing on an inkjet printer, for example, 450×500 dpi. For illustration purposes only, the description which follows, describes a Fast PCL printing system configured to these resolutions.

With reference to FIG. 2, a Native PCL job 42 is generated by a printer driver (not shown), or other software, to be delivered to a printer, image marking engine, image output terminal, or other printing device 44. This PCL job 42 is processed and rendered by the PCL interpreter 46 to native video data at 600×600 dpi×1-bit data. As previously discussed, this description with reference to FIG. 2 is limited to black/white, however, it is within the breadth of this disclosure to provide for color printing. Specifically, the PCL interpreter 46 producing four independent channels representing C, M, Y and K, each channel being processed according to the flow chart illustrated in FIG. 2.

With further reference to FIG. 2, the video data at 600×600 dpi×1-bit is further processed along two independent paths 48 and 50 to produce a video data output at 450×500 dpi×1-bit. One processing path includes a Tag Generation Module 48 and the other processing path includes a Data Processing Module 50.

The Tag Generation Module 48 provides an edge and/or thin line detection operation 52 on each pixel of the PCL job 46 using a detection mask. For example, if a pixel is determined to be located on a horizontal/vertical edge and/or line, a tag bit value associated with the pixel is set to 1, otherwise this bit is set to 0. This tag data associated with each pixel provides the basis for the Data Processing Module 50 to select specific video data as a function of the pixel location, i.e. whether the pixel is or is not located on an edge and/or thin line. As will be explained in further detail below, the ability of the Data Processing Module 50 to select specific video data at 450×500 dpi depending on the pixel location, enables the Fast PCL printing system 40 illustrated in FIG. 2 to provide reduced resolution video data to a printing device 44 while providing better control of the quality of the image printed.

The printing system illustrated in FIG. 2 is a tag-based binary resolution conversion system and algorithm which converts original 600×600 dpi×1-bit PCL interpreter 46 rendered data to 1-bit data at a default resolution. This includes a post-processing between the PCL interpreter 46 and the printing device 44. To achieve faster processing, this system is implemented in hardware.

As previously discussed, the printing system 40 disclosed includes a Tag Generation Module 48 and a Data Processing Module 50. The Tag Generation Module 48 includes an Edge and Thin Line Detector 52 which detects and assigns a one-bit classification tag 54 to each pixel of the video data at 600×600 dpi×1-bit using a predefined detection mask of N×M size, where N×M equals a 3×3 size which will be explained in further detail below.

The classification tags 54 are subsequently processed through a dilation operation 56 before being scaled down 58 to the default resolution. The dilation size is P×Q which is dependent on the ratio of first resolution to second resolution. In one exemplary embodiment of this disclosure, P×Q equals 3×3 for a resolution of 600×600 dpi as a first resolution and a resolution of 450×500 dpi as the second resolution. Also, the exemplary embodiment of this disclosure utilizes a nearest neighbor scaling algorithm 58. However, other scaling algorithms are known to those of ordinary skill in the art which can achieve satisfactory results.

A 1-bit tag 54, which can be programmed to represent either an edge and thin line, or alternatively represent an edge or thin line, allows optimal processing and rendering of each pixel based on its type. The output of the Tag Generation Module 48 includes tag data at the default resolution, which in the case illustrated in FIG. 2 is 450×500 dpi×1-bit.

With regard to the Data Processing Module 50, the 600×600 dpi×1-bit data is unpacked 60 to 8-bit data and subsequently parallel processed to produce two sets of 8-bit data at a default resolutions by two independent Resolution Conversion Modules 62 and 64. The two sets of resolution converted video data are subsequently processed using a Thresholding technique 66 for one path and an Error Diffusion technique 68 for the other path. The Thresholding Module 66 and Error Diffusion Module 68 are generally referred to as Rendering Modules.

Finally, the two sets of 1-bit data are MUXed 70 based on the tag data generated by the Tag Generation Module 48 for each pixel. Specifically, the MUX 70 selects video data at the default resolution, ex. 450×500 dpi, from the thresholding processing path if the corresponding pixel tag data is set to a logical 1, indicating the pixel is located on an edge and/or thin line. The thresholding processed video data 72 is selected in this case because thresholding provides a relatively better quality representation of the edge and/or thin line pixels, as compared to error diffusion.

Alternatively, if the corresponding pixel tag data is set to a logical 0, indicating the pixel is not located on an edge and/or thin line, the MUX 70 selects the video data processed through the error diffusion path. The error diffusion processed video data 74 providing a relatively better quality representation of image object and slanted edges/lines.

The output of the MUX 70 and Data Processing Module 50 is delivered to a Printing Device 44 (not shown) at the default resolution for this printing system. As previously discussed, for purposes of illustration only, the default resolution of the exemplary embodiment illustrated in FIG. 2 is 450×500 dpi×1-bit.

Discussed heretofore is the general operation of a system and method for a Fast PCL Printing System 40 which converts a PCL job 42 at a first resolution to video data at a second resolution for delivery to a printing device. It is also within the scope of this disclosure to provide data converted to a second resolution to other data receiving modules, including but not limited to a PC, computer network or other digital device. In addition, further discussion is provided below to describe the operations of the various exemplary modules illustrated in FIG. 2.

Figures 3A, 3B, 3C:
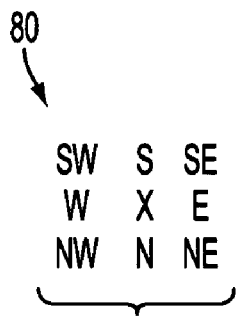
FIG. 3 is an illustration of a tag generation according to an exemplary embodiment.
Figure 4:
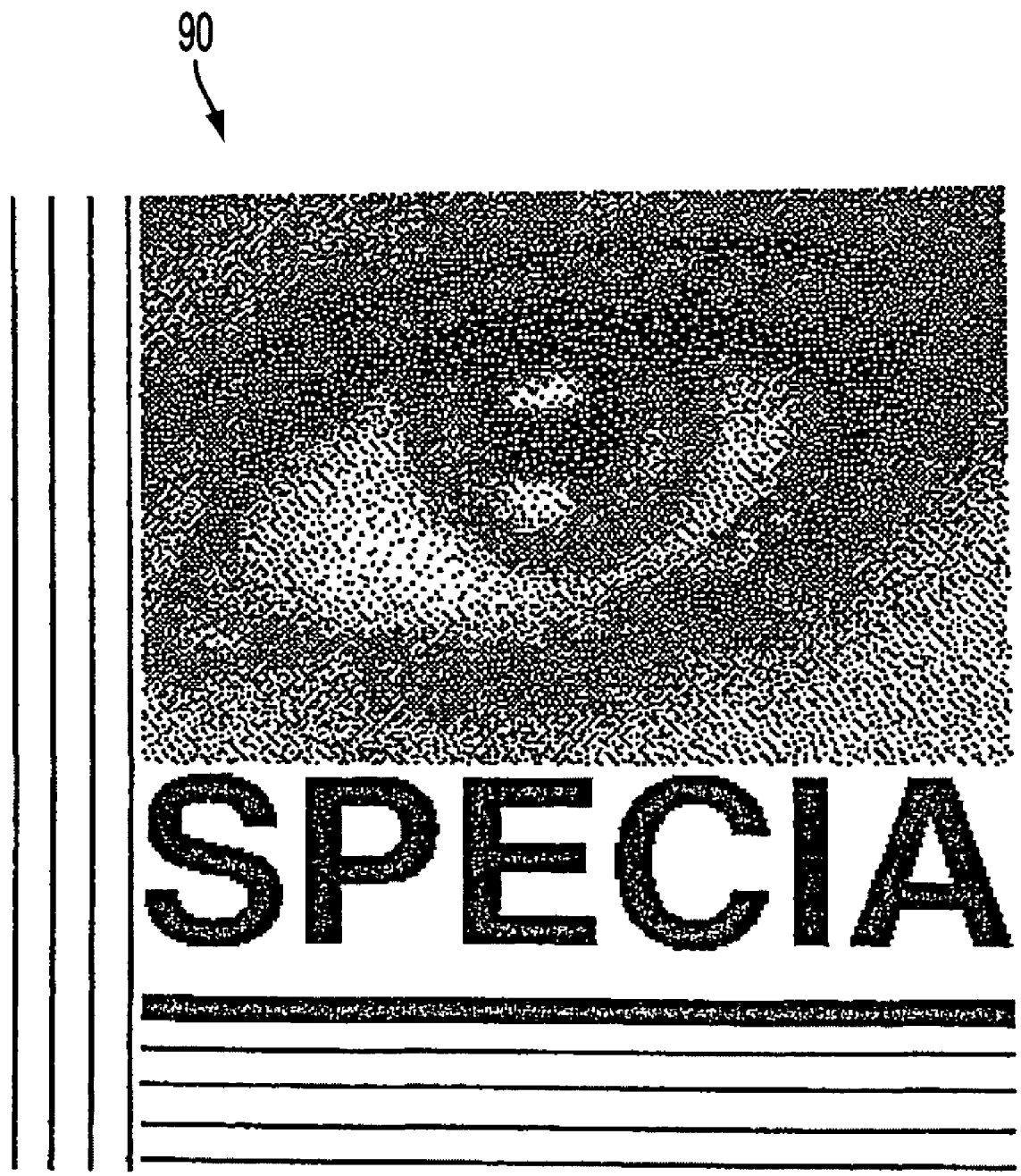
FIG. 4 is an illustration of a Native PCL 600×600 dpi 1-bit image according to an exemplary embodiment.

With regard to the Tag Generation Module 48, as previously discussed, initially video data at 600×600 dpi×1-bit is processed to determine horizontal and vertical edge and thin line pixels using a N×M size detection mask. For one exemplary embodiment of a 600×600 dpi to 450×500 dpi binary conversion case, as illustrated in FIGS. 3A, 3B and 3C, this can be accomplished by the incorporation of a 3×3 mask technique 80. For purposes of illustration, a logical 1 within a square of the 3×3 mask indicates a pixel on a horizontal/vertical edge and/or a horizontal/vertical line.

With reference to FIG. 3A, a 3×3 mask 80 is illustrated indicating an "X" as the current pixel being processed. Moreover, "SW", "S", "SE", "W", "E", "NW", and "N" and "NE" indicate other pixels whose relative locations to the current pixel as illustrated.

With reference to FIG. 3B, four possible 3×3 mask scenarios are illustrated which indicate the current pixel "X" is an edge pixel.

FIG. 3C illustrates two possible 3×3 mask scenarios which indicate the current pixel "X" is a thin line pixel. As is evident from these figures, a Fast PCL Printing System according to this disclosure can be configured to detect vertical/horizontal edge pixels and/or vertical/horizontal thin line pixels. As will be known by those of skill in the art, alternative mask patterns are available to detect the current pixel "X" as a vertical/horizontal edge pixel and/or vertical/horizontal thin line pixel.

With further reference to FIG. 2, subsequent to the video data being processed by the edge and thin line detector 52, an output of a logical 1 is provided to indicate the current pixel "X" is a vertical/horizontal edge pixel and/or a vertical/horizontal line pixel. Otherwise, the output of the edge and thin line detector 52 is set to a logical 0. As will be known by those of skill in the art, alternative configurations are available to provide an output indicating the status of a current pixel. For example, a logical 0 output could indicate a current pixel "X" is located on a vertical/horizontal edge or thin line as discussed.

Other variations of pixel edge and thin line detection include customizing this process for user image quality preferences. For example, fixing broken thin lines wile not removing the "partial pixeling" which appears as "jagging" in vertical and horizontal edges. This customization will enable retaining the text line width uniformity appearance.

With reference to FIGS. 3A-3C, below are illustrated examples of algorithms used to detect vertical/horizontal edge and thin line pixels.

employed by the Resolution Conversion submodule A 62. The Thresholding submodule 66 processes the video data at 450×500 dpi×1-bit using linear interpolation to provide high image quality on horizontal/vertical edges (i.e. no jagged lines, etc.) and horizontal/vertical thin lines (i.e. no broken or missing lines, etc.).

A TRC (Tone Reproduction Curve) submodule/algorithm 77 is provided to further adjust the density to achieve image quality objectives. The TRC curve or look up table is designed to conform to appropriate scaling algorithms, thresholding and default resolutions.

The ED processing path 76 initially converts video data at 600×600 dpi×8-bit to 450×500 dpi×1-bit by a scaling algorithm employed by the resolution conversion submodule B 64. The Error Diffusion submodule 68 processes the video data at 450×500 dpi×1-bit using a scaling algorithm. The Error Diffusion module 68 processes the video data to pro-

```
Detect edge only
    if (((SW==1)&&(S==1)&&(SE==1)&&(W==1)&&(X==1)&&(E==1)&&(NW==0)&&(N==0)&&(NE==0)) \ /* horizontal edge */
       // ((SW==0)&&(S==0)&&(SE==0)&&(W==1)&&(X==1)&&(E==1)&&(NW==1)&&(N==1)&&(NE==1)) \ /* horizontal edge */
       // ((SW==0)&&(S==1)&&(SE==1)&&(W==0)&&(X==1)&&(E==1)&&(NW==0)&&(N==1)&&(NE==1)) \ /* vertical edge */
       // ((SW==1)&&(S==1)&&(SE==0)&&(W==1)&&(X==1)&&(E==0)&&(NW==1)&&(N==1)&&(NE==1)) \ /* vertical edge */
           current_pixle_tag = 1          /* tag = 1 means edge */
    else
           current_pixle_tag = 0
Detect thin line only
    if (((SW==0)&&(S==0)&&(SE==0)&&(W==1)&&(X==1)&&(E==1)&&(NW==0)&&(N==0)&&(NE==0)) \/* horizontal single-pixel line */
       // ((SW==0)&&(S==1)&&(SE==0)&&(W==0)&&(X==1)&&(E==0)&&(NW==0)&&(N==1)&&(NE==0)) \ /* vertical single-pixel line */
           current_pixle_tag = 1          /* tag = 1 means thin line */
    else
           current_pixle_tag = 0
Detect both edge and thin line
    if (((SW==1)&&(S==1)&&(SE==1)&&(W==1)&&(X==1)&&(E==1)&&(NW==0)&&(N==0)&&(NE==0)) \ /* horizontal edge */
       // ((SW==0)&&(S==0)&&(SE==0)&&(W==1)&&(X==1)&&(E==1)&&(NW==1)&&(N==1)&&(NE==1)) \ /* horizontal edge */
       // ((SW==0)&&(S==1)&&(SE==1)&&(W==0)&&(X==1)&&(E==1)&&(NW==0)&&(N==1)&&(NE==1)) \ /* vertical edge */
       // ((SW==1)&&(S==1)&&(SE==0)&&(W==1)&&(X==1)&&(E==0)&&(NW==1)&&(N==1)&&(NE==1)) \ /* vertical edge */
       // ((SW==0)&&(S==0)&&(SE==0)&&(W==1)&&(X==1)&&(E==1)&&(NW==0)&&(N==0)&&(NE==0)) \/* horizontal single-pixel line */
       // ((SW==0)&&(S==1)&&(SE==0)&&(W==0)&&(X==1)&&(E==0)&&(NW==0)&&(N==1)&&(NE==0)) \ /* vertical single-pixel line */
           current_pixle_tag = 1          /* tag = 1 means edge or thin line */
    else
           current_pixle_tag = 0
```

With regard to the dilation process of the Tag Generation Module 48, subsequent to the edge and/or thin line detection process 52, the 600×600 dpi 1-bit tag data is further processed by a dilation module 56. The dilation process gradually enlarges the boundary of regions of detected edges and/or thin line. For the case of a 450×500 dpi resolution, a P×Q size, where P'Q equals a 3×3 size is utilized for the dilation process. The dilation process provides a preservation of tag information during the resolution scaling down process 58, performed subsequent to the dilation process.

The exemplary embodiment of this disclosure utilizes a nearest neighbor scaling algorithm 58 to perform resolution conversion for binary tag data. Specifically, the exemplary embodiment utilizes a nearest neighbor scaling algorithm to scale 600×600 dpi tag data to 450×500 dpi tag data because it is good at maintaining edge and thin line information.

With further reference to FIG. 2, as previously discussed, the Data Processing Module 50 initially unpacks the video data 60 at 600×600 dpi 1-bit data to 8-bit data. Subsequent to the unpacking operation 60 there are two parallel processing paths 76 and 78. For purposes of this discussion, one path 78 is referred to as the "TH" path and the other is referred to as the "ED" path 76.

The TH path 78 initially converts video data at 600×600 dpi×8-bit to 450×500 dpi×1-bit by a scaling algorithm vide a high quality image object and slanted edge/lines. One example of a scaling algorithm which preserves pixel density for quality image object and slanted edge/lines is Reiner Eschbach's "RESCON" algorithm. However, other algorithms useful to preserve pixel density, and known to those of skill in the art, are within the scope of this disclosure.

A TRC submodule/algorithm 79 is provided to further adjust the density to achieve image quality objectives. The TRC curve or lookup table is designed to conform to appropriate scaling algorithms, error diffusion and default resolutions.

With regard to the MUX 70, as previously discussed, 450× 500 dpi 1-bit data from parallel processing paths TH 72 and ED 74 are MUXed based on the tag information corresponding to pixel location. The output of the MUX 70 is sent to a Printing Device 44 (not shown), or other digital data receiver for processing. The printing device subsequently printing the video data at the default resolution, which is 450×500 dpi for the exemplary embodiment of this disclosure.

To illustrate one example of various video data outputs according to embodiments of the disclosure discussed heretofore, FIGS. 5A-5D are provided.

With reference to FIG. 5, illustrated is a Native PCL 600× 600 dpi 1-bit image 90 which is processed by the Tag Generator Module 48 and the Data Processing Module 50.

Figure 5A:
FIGS. 5A-5D are illustrations of post-processed PCL images according to an exemplary embodiment.

With reference to FIG. 5A, illustrated is a 450×500 dpi 1-bit "TH" path output image 100.

Figure 5B:

With reference to FIG. 5B, illustrated is a 450×500 dpi 1-bit "ED" path output image 102.

Figure 5C:

With reference to FIG. 5C, illustrated is a 450×500 dpi 1-bit TAG output image 104 wherein the edge and thin line pixels are detected.

Figure 5D:
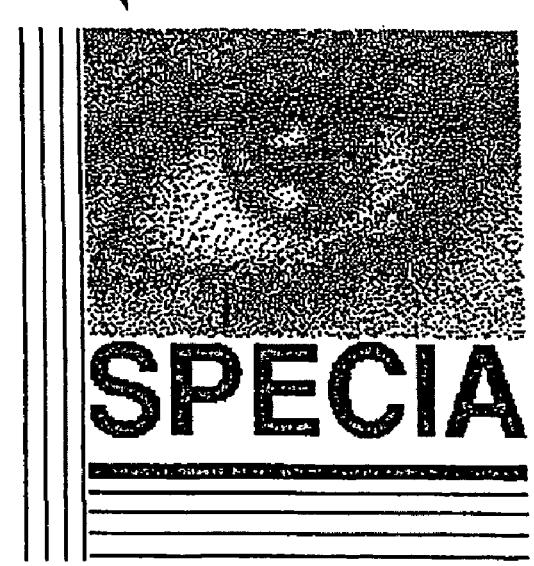

With reference to FIG. 5D, illustrated is a 450×500 dpi 1-bit image output 106 which is the result of an exemplary embodiment of this disclosure.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An image processing method comprising:
  a data processing process comprising:
    a first video data input process receiving a first video data group associated with one or more horizontal and vertical edges of an image, and one or more horizontal and vertical thin lines of the image;
    a second video data input process receiving a second video data group associated with one or more slanted edges and one or more slanted lines of the image, and one or more objects of the image;
    a tag data input process receiving tag data associated with image edge and image thin line detection data; and
    a first video data input providing the video data output to a first video data output if the tag data input indicates an image edge or image thin line, otherwise a second video data input providing the video data output,
    wherein the first video data group is 450×500 dpi×1-bit, the second video data group is 450×500 dpi×1-bit, the tag data is 450×500 dpi×1-bit, and the video data output is 450×500 dpi×1-bit.

2. The image processing method according to claim 1, comprising:
  a resolution conversion process module converting video data at a first resolution to video data at a second resolution; and
  a rendering process operatively connected to the resolution conversion process to receive the video data at a second resolution, and operatively connected to the first and second video data input processes, the rendering process providing the first video data group at the second resolution and the second video data group at the second resolution.

3. The image processing method according to claim 2, further comprising a PCL interpreter process operatively connected to the resolution conversion process, the PCL interpreter process providing said video data at a first resolution to the resolution conversion process module.

4. The image processing method according to claim 3, the PCL interpreter process converting a PCL job to said video data at a first resolution.

5. The image processing method according to claim 2, further comprising:
  a tag generation process operatively connected to the data processing process providing tag data to the tag data input process, and the tag generation process receives the video data at a first resolution.

6. An image processing method comprising:
  a data processing process comprising:
    a first video data input process receiving a first video data group associated with one or more horizontal and vertical edges of an image, and one or more horizontal and vertical thin lines of the image;
    a second video data input process receiving a second video data group associated with one or more slanted edges and one or more slanted lines of the image, and one or more objects of the image;
    a tag data input process receiving tag data associated with image edge and image thin line detection data;
    a first video data input providing the video data output to a first video data output if the tag data input indicates an image edge or image thin line, otherwise a second video data input providing the video data output;
    a resolution conversion process module, configured to converting video data at a first resolution to video data at a second resolution;
    a rendering module process operatively connected to the resolution conversion module process to receive the video data at a second resolution, and operatively connected to the said first and second video data input processes, the rendering module configured to process providing the said first video data group at the second resolution and the second video data group at the second resolution; and
    a tag generation module process operatively connected to the data processing module and configured to process providing tag data to the said tag data input process, and the tag generation module is configured to process receives the said video data at a first resolution;
  the tag generation process further comprising:
    a pixel edge and thin line detector process receiving the video data at a first resolution, and providing a first output if a pixel of the video data at a first resolution represents an edge or thin line pixel, and providing a second output if a pixel of the video data at a first resolution does not represent an edge or thin line pixel;
    a pixel dilation process receiving the pixel edge and thin line detector process output, and providing a dilation process output; and
    a scaling process receiving the dilation process output, and providing the tag data.

7. The image processing method according to claim 6, wherein the tag generation process utilizes a detection mask to provide tag data to the tag data input process.

8. An image processing method comprising:
  a data processing process comprising:
    a first video data input process receiving a first video data group associated with one or more horizontal and vertical edges of an image, and one or more horizontal and vertical thin lines of the image;
    a second video data input process receiving a second video data group associated with one or more slanted edges and one or more slanted lines of the image, and one or more objects of the image;
    a tag data input process receiving tag data associated with image edge and image thin line detection data; and
    a first video data input providing the video data output to a first video data output if the tag data input indicates an image edge or image thin line, otherwise a second video data input providing the video data output;
  the data processing process further comprising:
    a first channel process comprising:
      a resolution conversion process;

a TRC process; and
a thresholding process, the resolution conversion process operatively connected to the TRC process and the TRC process operatively connected to the thresholding process; and
a second channel process comprising:
a resolution conversion process;
a TRC process; and
an error diffusion process, the resolution conversion process operatively connected to the TRC process, and the TRC process operatively connected to the error diffusion process;
wherein the first channel provides the first video data group and the second channel provides the second video data group.

9. The image processing method according to claim 8, further comprising a video data unpacking process operatively connected to the first channel resolution conversion process and the second channel resolution conversion process, the video data unpacking process unpacking 1-bit video data representations of the image and providing 8-bit video data representations of the image to the first channel resolution conversion process and the second channel resolution conversion process.

10. A method of processing video data, the method comprising:
generating a first video data group associated with the horizontal and vertical edges of an image, and the horizontal and vertical thin lines of an image;
generating a second video data group associated with the slanted edges and slanted lines of the image, and the object of the image;
generating tag data associated with the image edge and image thin line detection data; and
generating a video data output, wherein the first video data group provides the data output if the tag data indicates an image edge or image thin line, otherwise the second video data group provides the video data output;
wherein the first video data group is 450×500 dpi×1-bit, the second video data group is 450×500 dpi×1-bit, the tag data is 450×500 dpi×1-bit, and the video data output is 450×500 dpi×1-bit.

11. The method according to claim 10, further comprising:
converting video data at a first resolution to video data at a second resolution; and
rendering the video data at a second resolution to generate the first video data group and the second video data group.

12. The method according to claim 11, further comprising:
interpreting a PCL job to provide said video data at a first resolution.

13. A method of processing video data, the method comprising:
generating a first video data group associated with the horizontal and vertical edges of an image, and the horizontal and vertical thin lines of the image;
generating a second video data group associated with the slanted edges and slanted lines of the image, and the object of the image;
generating tag data associated with the image edge and image thin line detection data; and
generating a video data output, wherein the first video data group provides the data output if the tag data indicates an image edge or image thin line, otherwise the second video data group provides the video data output;
wherein the tag data comprises:
providing a first output if a pixel is located on an edge or thin line, and a second output if the pixel is not located on an edge or thin line;
dilating the first output or second output to generate a dilation output; and
scaling the dilation output to generate tag data.

14. An image processing method comprising:
a data processing process further comprising:
a resolution conversion process converting data at a first resolution to data at a second resolution;
a rendering process operatively connected to the resolution conversion process to receive the data at a second resolution and operatively connected to the first and second data inputs, the rendering process providing the first data group at the second resolution and the second data group at the second resolution;
a tag generation process operatively connected to the data processing process and providing tag data to the tag data input, and the tag generation process receiving the data at a first resolution;
a pixel edge and thin line detector process receiving the data at a first resolution, and providing a first output if a pixel of the data at a first resolution represents an edge or thin line pixel, and providing a second output if a pixel of the data at a first resolution does not represent an edge or thin line pixel;
a pixel dilation process receiving the pixel edge and thin line detector output, and providing a dilation process output; and
a scaling process receiving the dilation process output, and providing the tag data.

15. The image processing method according to claim 14, wherein the image processing method is a xerographic image processing method.

16. The image processing method according to claim 14, wherein the image processing method is an inkjet image processing method.

* * * * *